(12) United States Patent
Morris et al.

(10) Patent No.: US 11,994,876 B2
(45) Date of Patent: May 28, 2024

(54) IN-FLIGHT UAV DEPLOYMENT AND RETRIEVAL PLATFORM

(71) Applicant: Sierra Nevada Corporation, Sparks, NV (US)

(72) Inventors: Stephen Morris, Sunnyvale, CA (US); Jean-Francois Clavreul, Berkeley, CA (US); Hervé Hilaire, Palo Alto, CA (US)

(73) Assignee: Sierra Nevada Company, LLC, Sparks, NV (US)

( * ) Notice: Subject to any disclaimer, the term of this patent is extended or adjusted under 35 U.S.C. 154(b) by 0 days.

(21) Appl. No.: 17/703,811

(22) Filed: Mar. 24, 2022

(65) Prior Publication Data
US 2022/0308596 A1    Sep. 29, 2022

Related U.S. Application Data

(60) Provisional application No. 63/165,157, filed on Mar. 24, 2021.

(51) Int. Cl.
| | |
|---|---|
| *G05D 1/06* | (2006.01) |
| *B64C 39/02* | (2023.01) |
| *G05D 1/00* | (2006.01) |
| *G08G 5/00* | (2006.01) |
| *B64U 70/80* | (2023.01) |
| *B64U 101/00* | (2023.01) |

(52) U.S. Cl.
CPC ......... *G05D 1/0669* (2013.01); *B64C 39/024* (2013.01); *G08G 5/003* (2013.01); *B64U 70/80* (2023.01); *B64U 2101/00* (2023.01)

(58) Field of Classification Search
CPC .... G05D 1/0669; B64C 39/024; G08G 5/003; B64U 70/80; B64U 2101/00
See application file for complete search history.

(56) References Cited

U.S. PATENT DOCUMENTS

| | | | |
|---|---|---|---|
| 9,764,836 B1* | 9/2017 | Elzinga | B64C 39/024 |
| 11,003,186 B1* | 5/2021 | Neal, III | G05D 1/0038 |
| 2017/0349283 A1* | 12/2017 | Paunicka | B64C 39/024 |
| 2017/0369169 A1* | 12/2017 | Lee | B64D 5/00 |
| 2020/0172236 A1 | 6/2020 | George | |
| 2020/0175471 A1* | 6/2020 | Tsuruta | B64C 39/024 |
| 2020/0346781 A1* | 11/2020 | Bosma | B64D 1/22 |
| 2022/0028286 A1* | 1/2022 | Amsili | G05D 1/104 |
| 2022/0250768 A1* | 8/2022 | Oshima | B61B 13/00 |

* cited by examiner

*Primary Examiner* — Hussein Elchanti
(74) *Attorney, Agent, or Firm* — Mintz Levin Cohn Ferris Glovsky and Popeo, P.C.

(57) ABSTRACT

Methods, systems and apparatus for the deployment and retrieval of child UAVs from a V-TOL UAV Mothership. The Mothership may be piloted from a base station to one or more destination locations. At the destination location, one or more child UAVs may be deployed from a cargo bay module. The child UAVs perform tasks or complete a mission before coordinating their retrieval with the V-TOL UAV Mothership. The Mothership may plan an intercept course to retrieve the child UAVs in mid-flight or coordinate a hovering type retrieval with the child UAVs. The child UAVs are retrieved through an actuated frontal opening which provides access to the cargo bay without having to navigate through turbulence created beneath the hovering Mothership by the vertical thrust rotors.

12 Claims, 13 Drawing Sheets

IN-FLIGHT UAV DEPLOYMENT AND RETRIEVAL PLATFORM

CROSS-REFERENCE TO RELATED APPLICATION

This application claims priority to U.S. Patent Application No. 63/165,157, filed on Mar. 24, 2021, which is hereby incorporated by reference in its entirety herein.

FIELD

The present invention relates generally to the deployment and retrieval of child Unmanned Aerial Vehicles (UAVs) from a larger Vertical Take-Off and Landing (V-TOL) UAV, as well as the use of computer vision, signal localization and flight coordination to facilitate recovery of deployed children UAVs.

BACKGROUND

Unmanned Aerial Vehicles (UAVs) are becoming more common in all sectors of industry. Surveillance, monitoring/inspection, package delivery and entertainment have all seen an increase in the use of UAVs. Flight duration of UAVs has become the limiting factor when it comes to the usefulness and ubiquitous use of drones in modern industry.

Long duration UAVs may be able to stay in flight for an extended period of time and travel distances that are unattainable by smaller UAVs such as quad-copters, multi-copters or other multirotor UAVs. However, these long duration UAVs lack the hovering capabilities required to perform inspections and other useful tasks. The larger UAVs are less agile and less maneuverable.

Conversely, smaller multirotor UAVs excel at inspection roles as they are more maneuverable and capable of flying in closer proximity to buildings, structures and objects, as well as fly into building and structures while also avoiding collisions. These smaller multirotor UAVs sacrifice longevity for maneuverability and are unable to travel long distances or maintain flight for extended periods of time.

SUMMARY

The systems and methods described herein provide for the deployment and retrieval of child UAVs from a V-TOL UAV Mothership. In one embodiment, the Mothership may be piloted, by a flight control unit, from a base station or departure location to one or more destination locations. The Mothership may deploy one or more child UAVs upon reaching each destination location.

In some embodiments, the deploying may comprise controlling a cargo bay attached to a fuselage of the Mothership. In some embodiments, the cargo bay may be a modular unit that is removably attached to the fuselage. A cargo bay control unit may control one or more cargo bay doors to allow one or more child UAVs to be deployed.

In some embodiments, a UAV deployment and retrieval unit may be used in the deployment and retrieval of the child UAVs. The UAV deployment and retrieval unit may release one or more child UAVs through the open one or more cargo bay doors from a holding device. The one or more deployed child UAVs may then navigate independently to their respective destination locations. The destination locations may be determined before the mission is commenced (initial departure of the Mothership), during flight to the one or more destinations, after the Mothership has arrived at and/or already deployed one or more child UAVs or combination thereof.

In some embodiments, after the Mothership has deployed one or more of the child UAVs at the determined destination locations, the Mothership may be placed into a holding pattern or loitering flight path to conserve energy while remaining in the vicinity of the deployed child UAVs.

In some embodiments, the Mothership may break out of the holding pattern/loitering flight path in order to retrieve the one or more child UAVs. There retrieval may be accomplished by hovering the Mothership at a retrieval location and allowing the one or more child UAVs to fly into a frontal bay opening, or to be retrieved during horizontal flight by having the one or more child UAVs match the Mothership's heading and travel at a speed which would allow the Mothership to overtake and capture the one or more child UAVs.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
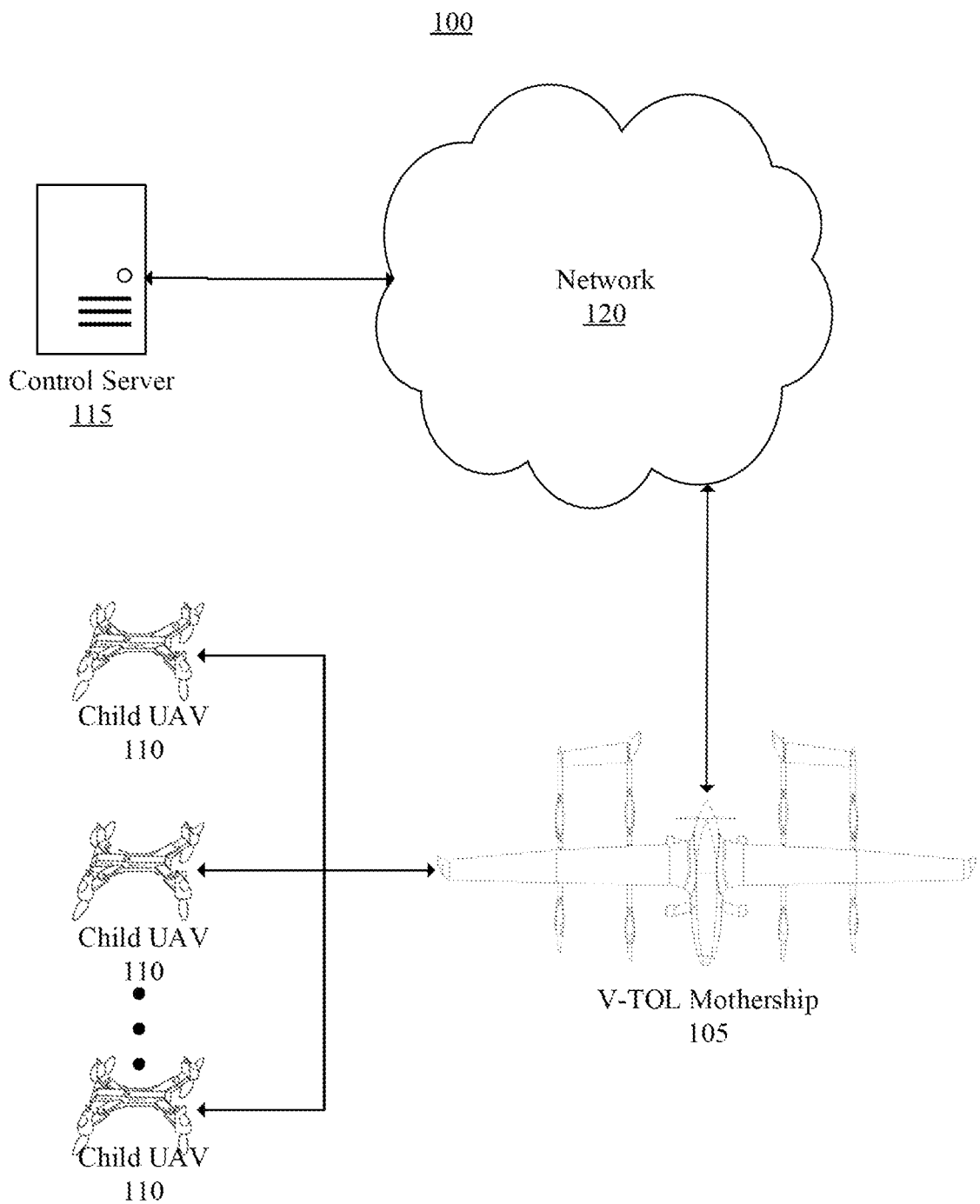
FIG. 1 is a diagram illustrating an exemplary in-flight UAV deployment and retrieval environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system, platform and methods for the deployment and retrieval of child UAVs from a V-TOL UAV Mothership. In one embodiment, the Mothership may be piloted, by a flight control unit, from a base station or departure location to one or more destination locations. The Mothership may deploy one or more child UAVs upon reaching each destination location.

In some embodiments, the deploying may comprise controlling a cargo bay attached to a fuselage of the Mothership. In some embodiments, the cargo bay may be a modular unit that is removably attached to the fuselage. A cargo bay control unit may control one or more cargo bay doors. The controlling may cause the one or more cargo bay doors to open or to close. In the case of deploying the one or more child UAVs, the cargo bay doors may be opened to allow the child UAVs to be deployed. The cargo bay doors may be located at an underside of the cargo bay, wherein the cargo bay control unit opens one or more cargo bay doors.

In some embodiments, a UAV deployment and retrieval unit may be used in the deployment and retrieval of the child UAVs. The UAV deployment and retrieval unit may release one or more child UAVs through the open one or more cargo bay doors from a holding device. The one or more deployed child UAVs may then navigate independently to their respective destination locations. The destination locations may be determined before the mission is commenced (initial departure of the Mothership), during flight to the one or more destinations, after the Mothership has arrived at and/or already deployed one or more child UAVs or combination thereof.

In some embodiments, after the Mothership has deployed one or more of the child UAVs at the determined destination locations, the Mothership may be placed into a holding pattern or loitering flight path to conserve energy while remaining in the vicinity of the deployed child UAVs.

In some embodiments, the Mothership may break out of the holding pattern/loitering flight path when the one or more child UAVs have completed their missions/tasks. The Mothership may determine a flight path, from the current position in the holding pattern to one or more retrieval locations for the one or more child UAVs. Alternatively, the Mothership may determine a plurality of flight paths based on the location of the one or more child UAVs, environmental conditions, the condition of the child UAVs, the condition of the Mothership, the estimated completion time of the child UAVs mission/task, the estimated time of arrival at each child UAVs retrieval location or combination thereof. The Mothership may then choose which of the determined flight paths to implement. The choice itself may be based on difficulty of retrieval, maximizing battery life/minimizing battery usage, most time efficient or combination thereof.

In some embodiments, the Mothership may navigate along the chosen flight path in order to intercept and retrieve each of the deployed child UAVs. Upon reaching a predetermined distance from the retrieval location, the Mothership may retract or open an actuated frontal bay opening to allow the child UAVs to be captured/retrieved.

In some embodiments, the Mothership may determine a retrieval procedure for each of the child UAVs. Upon determining of the retrieval procedure for each of the child UAVs, the Mothership may initiate communication with each child UAV and transmit the determined retrieval procedure to each child UAV. The retrieval procedure may be based on a hovering type retrieval or an in-flight type retrieval. For example, for a hovering type retrieval, the Mothership may determine a retrieval location for the child UAV, an altitude at which the retrieval will be performed and a time of retrieval. For the hovering type retrieval, the Mothership may navigate to the retrieval location at the specified time and perform a hovering maneuver at the specified altitude. The child UAV may then navigate to the determined retrieval location and altitude to begin the retrieval and capture processed.

In some embodiments, the Mothership and child UAVs may include a beacon unit along with sensors, transmitters, transceivers, receivers, microphones, speakers, transducers or combination thereof. Sensors may comprise image sensors (including IR, UV, visible light or other spectral wavelengths), LIDAR sensors, radar, sonar, ultrasound, stereoscopic image sensors, time-of-flight camera, gyroscopes, accelerometers, magnetometer or combination thereof. Other sensors may be used that allow for coordination of navigation between the Mothership and the child UAVs. The sensors may also include air speed sensors, ground speed sensors, GPS units, wind speed sensors, environmental sensors (temperature, humidity, pressure) and/or course deviation sensors.

In some embodiments, cameras on the Mothership, the child UAV or both may be used to identify one another and determine a relative distance and orientation between the two. This information may be used to adjust the hovering maneuver of the Mothership as well as the approach the child UAV takes to arrive at the frontal bay opening of the Mothership.

The beacon unit may be a nondirectional beacon or a directional beacon. The beacon may be used to determine a relative distance in space between the Mothership and the one or more child UAVs. Each child UAV may have a different beacon frequency, pattern or other identifying feature. The beacon may also include information encoded in the transmitted beacon. Transmissions from the beacon units as well as communication units and other transmitters/transceivers may be encoded and/or encrypted. Information transmitted from the Mothership to a child UAV may be relayed or retransmitted to additional child UAVs that are out of range of the Mothership or otherwise unable to communicate directly with the Mothership. Each child UAV may also use long range, sub-1 GHz radio communication to communicate with one another and/or the Mothership. The Mothership and child UAVs may also have GSM, LTE or other mobile, cellular or satellite communication capabilities.

In some embodiments, the child UAV may be retrieved through an in-flight retrieval procedure. The Mothership may determine the retrieval location for the child UAV, the time and altitude at which the retrieval will be performed, and a heading and ground speed of the Mothership at the retrieval location. The in-flight retrieval may be performed during horizontal/forward flight and without the assistance of vertical thrust rotors to assist in maintaining lift. The Mothership may coordinate an intercept maneuver between the Mothership and the child UAV. The coordinated intercept maneuver may be adjusted to compensate for environmental conditions, flight parameters or condition of the Mothership or child UAV. Adjustments may be made to the timing of the Mothership and child UAV arrival at the retrieval location, the location of the retrieval, altitude of the retrieval, speed and heading, flight path and type of retrieval procedure in general. For example, if a child UAV is unable to match a speed of the Mothership because of wind or because the power requirements to do so would deplete the battery to a dangerous level, the retrieval procedure may be changed from an in-flight type retrieval procedure to a hovering type retrieval procedure. This would allow the Mothership to determine a new retrieval location that is closer to the child UAV so that the retrieval may have a higher likelihood of success.

In some embodiments, the one or more child UAVs may be retrieved through the use of a capture device which may be a subunit of the deployment and retrieval unit. When the frontal bay opening is open, the one or more child UAVs may be piloted through the opening and captured by the capture device. The capture device may move relative to the Mothership and cargo bay to grab/capture a child UAV. The capture device may also be stationary or partially stationary, and the capturing accomplished by maneuvering the child UAV into a position over and then landing on the capture device. Upon contact between the capture device and the child UAV, the capture device may transfer the child UAV to a storage position in the deployment and retrieval unit. The deployment and retrieval unit may also include one or more release devices, which may be used in the deployment of the child UAVs. The release devices may hold the child UAVs in their original storage location until instructed to deploy stored child UAV. The child UAVs may also be stored in a location other than their original storage location or storage order.

In some embodiments, the child UAVs may be recharged upon retrieval and being stored. The batteries of the one or more child UAVs may also be physically replaced with a fully charged or partially charged battery. For example, if a child UAV has a depleted battery, and the Mothership would not be able to charge the child UAV battery to a level sufficient to complete the next task/mission, the battery may be physically detached/removed and replaced with a new/different battery before being redeployed. If there are no fully charged batteries available for the child UAV, a partially charged battery may be installed for the task/mission if it is determined that the partially charged battery would provide the power necessary to complete the task/mission.

The Mothership may include an electric generator coupled to a horizontal thrust unit. The horizontal thrust unit may comprise an internal combustion engine, or other power units. In some embodiments, horizontal thrust may be generated by a propeller coupled to the internal combustion engine. The horizontal thrust unit may also be an electric or hybrid unit, wherein an internal combustion engine is used as an electric generator and the generated electricity is used to power an electric motor directly as well as charge battery units for use during high demand maneuvers. In some embodiments, the electric generator may comprise hydrogen fuel cells or other non-internal combustion energy sources. Other energy and propulsion sources such as liquid nitrogen (liquid air) engines, compressed air engines, photovoltaic or solar thermal may be used in the propulsion and electrical needs of the Mothership and child UAVs.

FIG. 1 is a diagram illustrating an exemplary in-flight UAV deployment and retrieval environment 100 in which some embodiments may operate. In-flight UAV deployment and retrieval environment 100 may comprise V-TOL Mothership 105, child UAVs 110, control server 115 and network 120.

V-TOL Mothership 105 may be a fixed wing V-TOL UAV or other UAV capable of vertical take-off and landing as well as performing hovering maneuvers. The Mothership 105 may carry one or more child UAVs 110. The one or more child UAVs may be deployed from the Mothership from either a hover or in forward horizontal flight. The child UAVs 110, upon release from a release device in the cargo bay, may self-correct as they freefall from the Mothership.

Control Server 115 may communicate with the Mothership 105 over network 120. Network 120 may be an intranet, internet, mesh, peer-to-peer or other communication network that allows the control server 115 to communicate with mothership 105. Control server 115 may also communicate directly with child UAVs 110, or may use the Mothership 105 to relay commands, tasks or missions to the child UAVs. The control server 115 may provide destination locations, flight plans, mission plans, weather forecasts, or other information to the Mothership 105 before departure from a base station. Information may also be transmitted to the Mothership 105 during and after the mission.

Figure 2A:
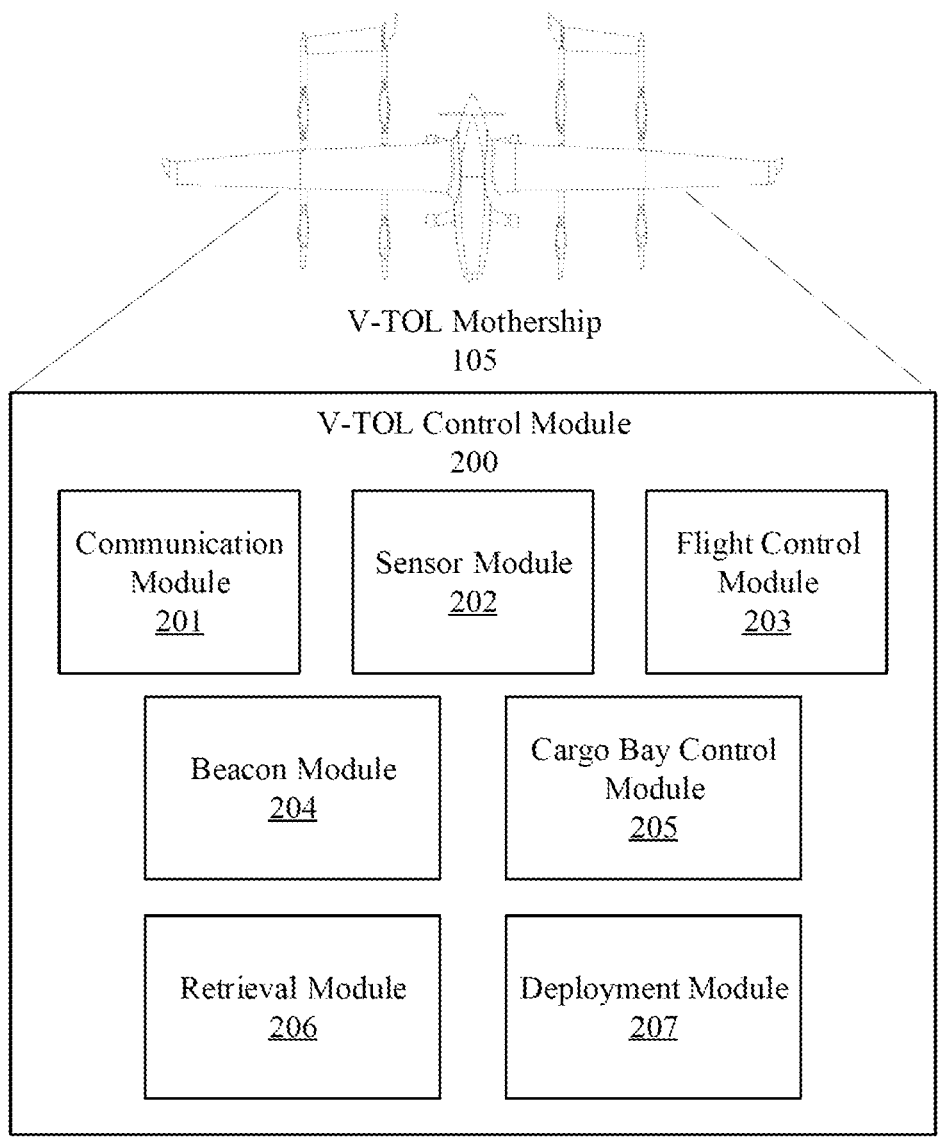
FIG. 2A is a diagram illustrating an exemplary V-TOL UAV Mothership in accordance with aspects of the present disclosure.

FIG. 2A is a diagram illustrating an exemplary V-TOL UAV Mothership 105 in accordance with aspects of the present disclosure. V-TOL Mothership 105 may comprise a V-TOL control module 200, which itself may comprise communication module 201, sensor module 202, flight control module 203, beacon module 204, cargo bay control module 205, retrieval module 206 and deployment module 207.

V-TOL control module 200 may control some or all hardware and software on the UAV Mothership 105. Communication module 201 may comprise hardware and software to communicate over WIFI (802.11ac/b/g/n), Bluetooth, Bluetooth Low Energy (BLE), sub-1 GHz, mesh, peer-to-peer, cellular/mobile communications, satellite communications or other short and long range communications protocols.

Sensor module 202 may comprise accelerometers, gyroscopes, GPS sensors, magnetometers, inertial measurement units, tilt sensors, intake flow sensors, camera sensors, thermal sensors, multispectral/hyperspectral sensors, depth sensors, LIDAR, RADAR, SONAR, environmental sensors (temperature, humidity, pressure), wind sensors or combination thereof.

Flight control module 203 may receive information from the sensor module 202. The received information may be used in the planning and determination of flight paths and retrieval procedures. Real-time updates from the sensor module 202 may be used to adjust flight paths and retrieval procedures on the fly.

Beacon module 204 may be used by the Mothership 105 and child UAVs 110 to determine a relative distance between the two. Mothership 105 and child UAVs 110 may also use a beacon signal generated by each other to aid in locating one another. The beacon may be non-directional.

Cargo bay control module 205 may control the cargo bay doors used in the deployment of child UAVs 110 as well as a frontal bay opening used in the retrieval of child UAVs 110. The cargo bay control module 205 may coordinate the opening and closing of the lower bay doors deployment module 207 and the opening and closing of the frontal bay opening with the retrieval module 206.

Retrieval module 206 may control the retrieval of the child UAVs 110 by the Mothership 105. The retrieval module 206 may be used in the coordination of the retrieval procedure. The retrieval module 206 may monitor the position of each child UAV 110 as it enters the frontal bay opening and provide feedback to the Mothership 105 and the child UAV 110 so that any necessary adjustments may be made. The retrieval module may wait for the child UAV 110 to land on a capture device before grasping the child UAV 110. In some embodiments, the retrieval module 206 may control a capture device to articulate and capture the child UAV 110 in mid-air. The retrieval module 206 may also control the position of the capture device in 2 dimension, 3 dimensions and up to 6 degrees of freedom, allowing the capture device to match the position and orientation/attitude of the child UAV 110.

Upon capture of the child UAV 110, the retrieval module 206 may instruct the capture device to store the child UAV 110 in a holding position of a release device. The child UAVs may originally be held in the release device prior to being deployed, and therefore, stored in the same manner as they were before deployment.

Deployment module 207 may communicate with the cargo bay control module 205 to initiate a deployment of child UAVs 110. After the bay doors have been opened by the cargo bay control module 205, the deployment module 207 may instruct the release device to release/drop one or more stored child UAVs 110 through the open cargo bay doors.

Figure 2B:
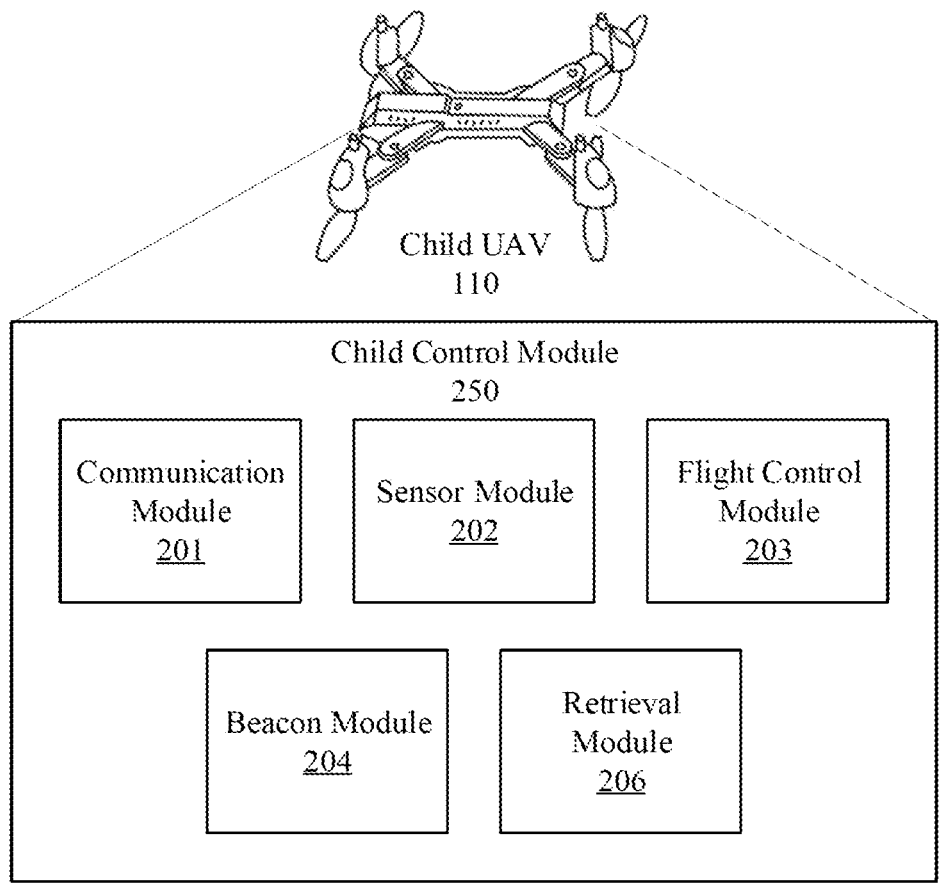
FIG. 2B is a diagram illustrating an exemplary child UAV in accordance with aspects of the present disclosure.

FIG. 2B is a diagram illustrating an exemplary child UAV in accordance with aspects of the present disclosure. Child UAV 110 may comprise a child control module 250, which itself may comprise communication module 201, sensor module 202, flight control module 203, beacon module 204 and retrieval module 206.

Child control module 250 may control some or all hardware and software on the UAV Mothership 105. Communication module 201, sensor module 202 and beacon module 204 may be the same or similar to that described with regard to FIG. 2A, and therefore will not be described further for sake of brevity.

Flight control module 203 may be similar to that as described with respect to FIG. 2A, but may also include controls specific to a multirotor UAV. The flight control module 203 may also pilot the child UAV 110 during performance of the assigned task or mission. Adjustments to the path, height, angle or other flight parameters may be made in real-time based on sensor readings and mission requirements. In some embodiments, the tasks/missions to be completed by the child UAVs required a level of autonomy, and cannot be predetermined before the start of the mission. Changes to points of interest may be made based on observations made by the child UAV. Regions, objects or components that require additional inspection may require the child UAV to perform additional or new maneuvers. The flight control module 203 may plan additional passes, different paths, different angles of view or other maneuvers and sensor orientations to retrieve the information required by the task/mission.

Retrieval module 206 may be similar to that as described with respect to FIG. 2A, but may also include controls specific to a multirotor UAV. The retrieval module 206 may use sensor module 202 to aid in the landing or docking of the child UAV with the capture device. Retrieval module 206 may implement a camera based landing procedure to navigate the child UAV into a capturable position on the capture device. The retrieval module 206 may also use feedback from the sensor module 202 to adjust an angle of approach to the frontal bay opening in order to avoid turbulence or other possible dangers associated with retrieval of child UAVs.

FIGS. 3A-3G illustrating a V-TOL UAV Mothership 105 performing an exemplary UAV deployment and retrieval procedure 300 in accordance with aspects of the present disclosure. The Mothership 105 may comprise a fuselage 301, a cargo bay module 302, an actuated frontal bay opening 303, a child capture device 304, a child deployment device 305, child UAVs 306, lower bay doors 307, vertical thrust units 320 and a horizontal thrust unit 330.

Cargo bay module 302 may be a modular unit. The cargo bay module 302 may be removably attached to the fuselage 301. The cargo bay module may hold have an actuated frontal bay opening 303, which may be used during the retrieval of child UAVs 306. Within the cargo bay module 302, there may be a child capture device 304, child deployment device 305, and one or more child UAVs 306. Lower bay doors 307 may be positioned on the bottom side of the cargo bay module 302 and controlled by the cargo bay control module 205.

The child capture device 304 may be positioned on the floor of the cargo bay module 302 and proximate to the actuated frontal bay opening 303. The child capture device 304 may be used to capture a child UAV 306 during a retrieval procedure, transfer the child UAV 306 to a rear portion of the cargo bay module 302 and place the child UAV 306 into a child deployment device 305 for storage prior to being deployed again.

The child deployment device 305 may also be used as storage for child UAVs 306 before being deployed. Child UAVs 306 may be released from the child deployment device 305 upon being instructed to deploy one or more child UAVs 306.

Vertical thrust units 320 may be electric rotors driven by an electric battery, fuel cell or electric generator, so as to generate lift and maneuver the Mothership 105. The vertical thrust units may be coaxially driven, contrarotating propellers or aligned off axis to allow for flight to be controlled solely on the basis of thrust from the individual thrust units 320. In some embodiments, the vertical thrust units 320 may be tiltable and/or the propeller blades may be variable pitch blades.

The horizontal thrust unit 330 may comprise an internal combustion engine coupled to a propeller to generate horizontal thrust and forward flight. The horizontal thrust unit 330 may also be connected to an electric generator to provide power for driving the vertical thrust units 320, charging a batter system of the Mothership 105 for use by the vertical thrust units 320 and for the recharging of child UAV batteries. The charging may be performed at any time while the child UAVs 306 are stored in the child deployment device 305. In some embodiments, the child UAVs 306 may be charged wirelessly through inductive power transfer from the Mothership 105 to the child UAVs 306. This may be extended outside of the cargo bay module 302 in some embodiments. The extension of the wireless charging field to a position in front of the Mothership 105 during a retrieval procedure for a child UAV 306 may provide additional power that may be used to overcome turbulence or forces that may otherwise drain an already depleted battery. For example, after a child UAV 306 has performed an assigned mission, the estimated energy needed to return to the Mothership 105 or to a retrieval location may change due to environmental conditions. In the case where the child UAV 306 would have originally had enough remaining battery to return, a change in wind may require a larger amount of energy to be used for returning to the Mothership 105. The mothership 105 may direct an electromagnetic field to wirelessly induce a current in the child UAV 306 to provide additional energy to ensure that the child UAV 306 reaches the actuated frontal bay opening 303 even after the battery would have normally been depleted.

Figure 3A:
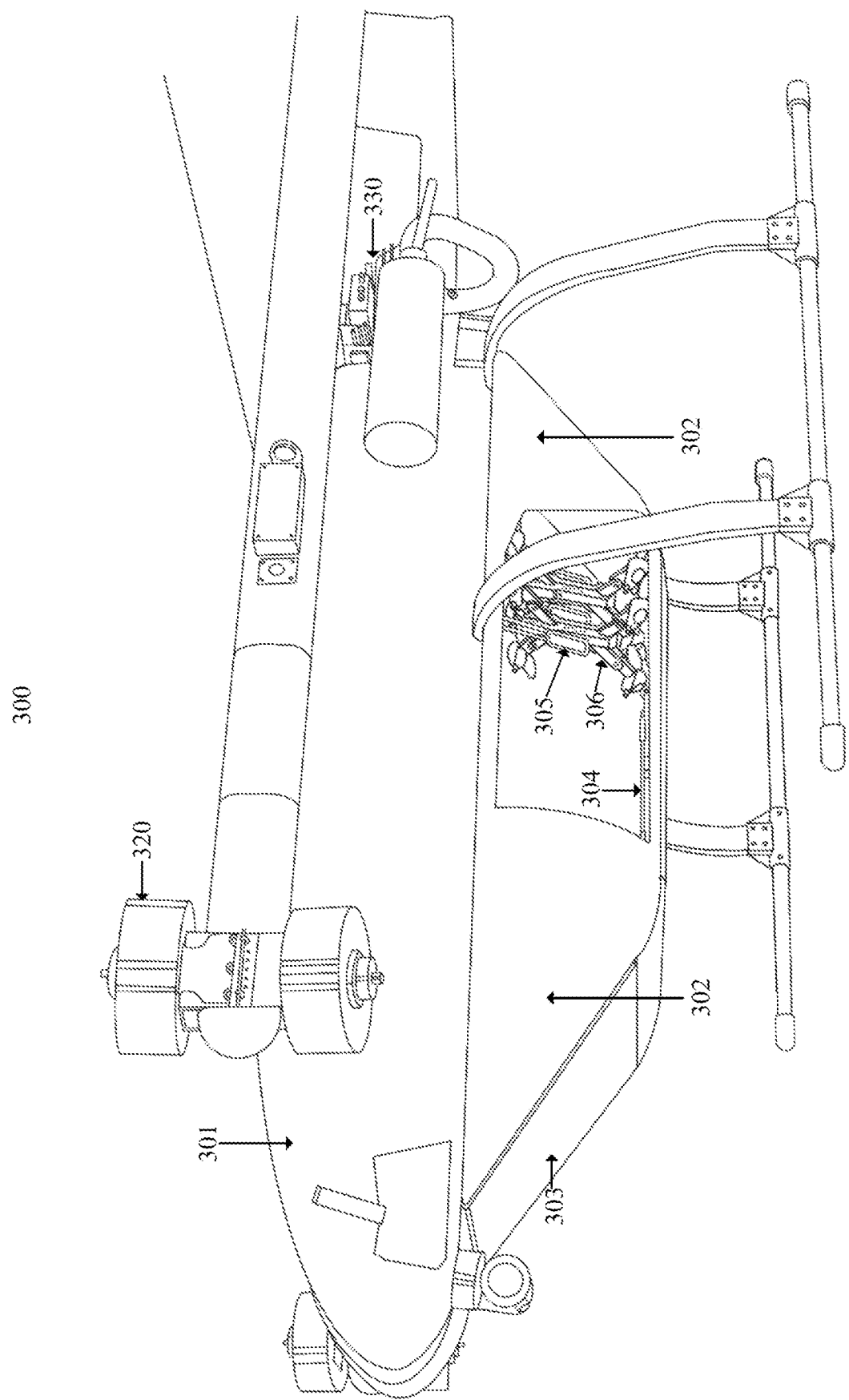
FIG. 3A is a diagram illustrating an exemplary V-TOL UAV Mothership in accordance with aspects of the present disclosure.
Figure 3B:
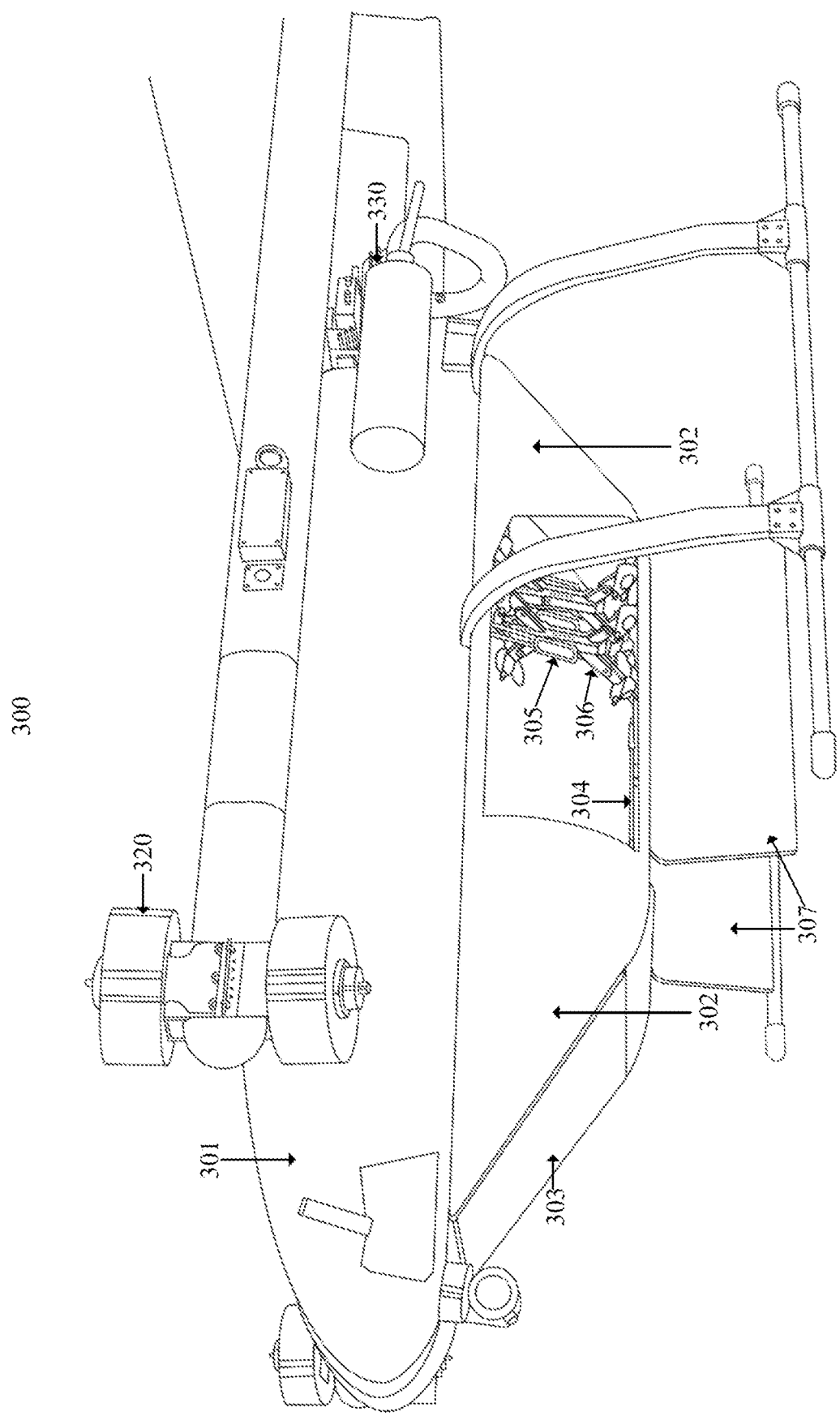
FIG. 3B is a diagram illustrating an exemplary V-TOL UAV Mothership in accordance with aspects of the present disclosure.
Figure 3C:
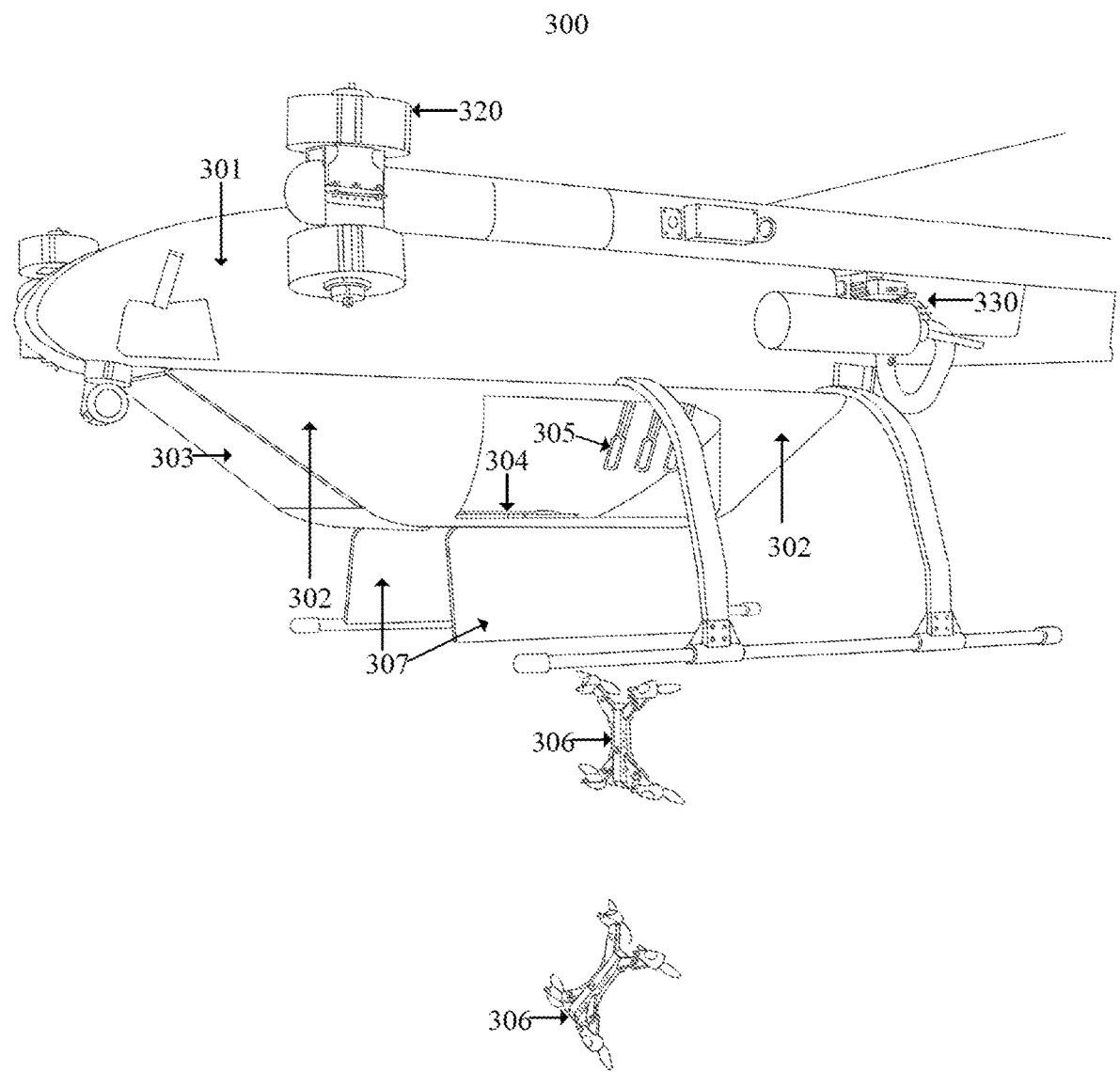
FIG. 3C is a diagram illustrating an exemplary V-TOL UAV Mothership in accordance with aspects of the present disclosure.

In FIG. 3A, the Mothership 105 holds the child UAVs 306 in the cargo bay module 302 while en route to a deployment destination. In FIG. 3B, the Mothership reaches a deployment destination and opens the lower bay doors 307 in preparation for deployment. Upon opening the lower bay doors 307, child deployment device 305 may be instructed to release one or more child UAVs 306. FIG. 3C illustrates the release of the child UAVs 306 from the child deployment device 305. The child UAVs fall through the open lower bay doors 307 and begin to navigate towards their mission target. Upon being dropped, the child UAVs 306 may perform a recovery procedure to orient itself and regain control before navigating to the mission target.

Figure 3D:
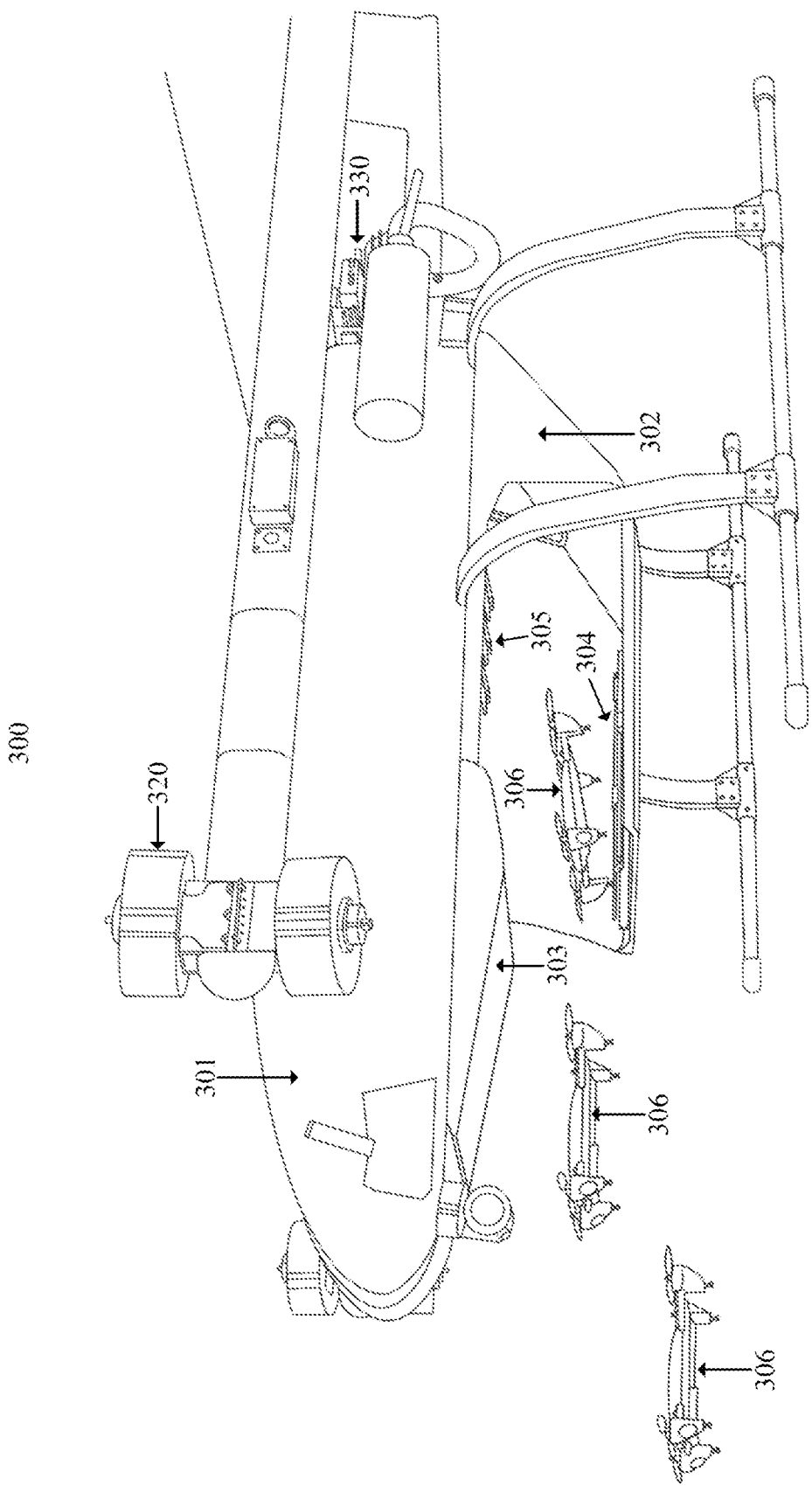
FIG. 3D is a diagram illustrating an exemplary V-TOL UAV Mothership in accordance with aspects of the present disclosure.
Figure 3E:
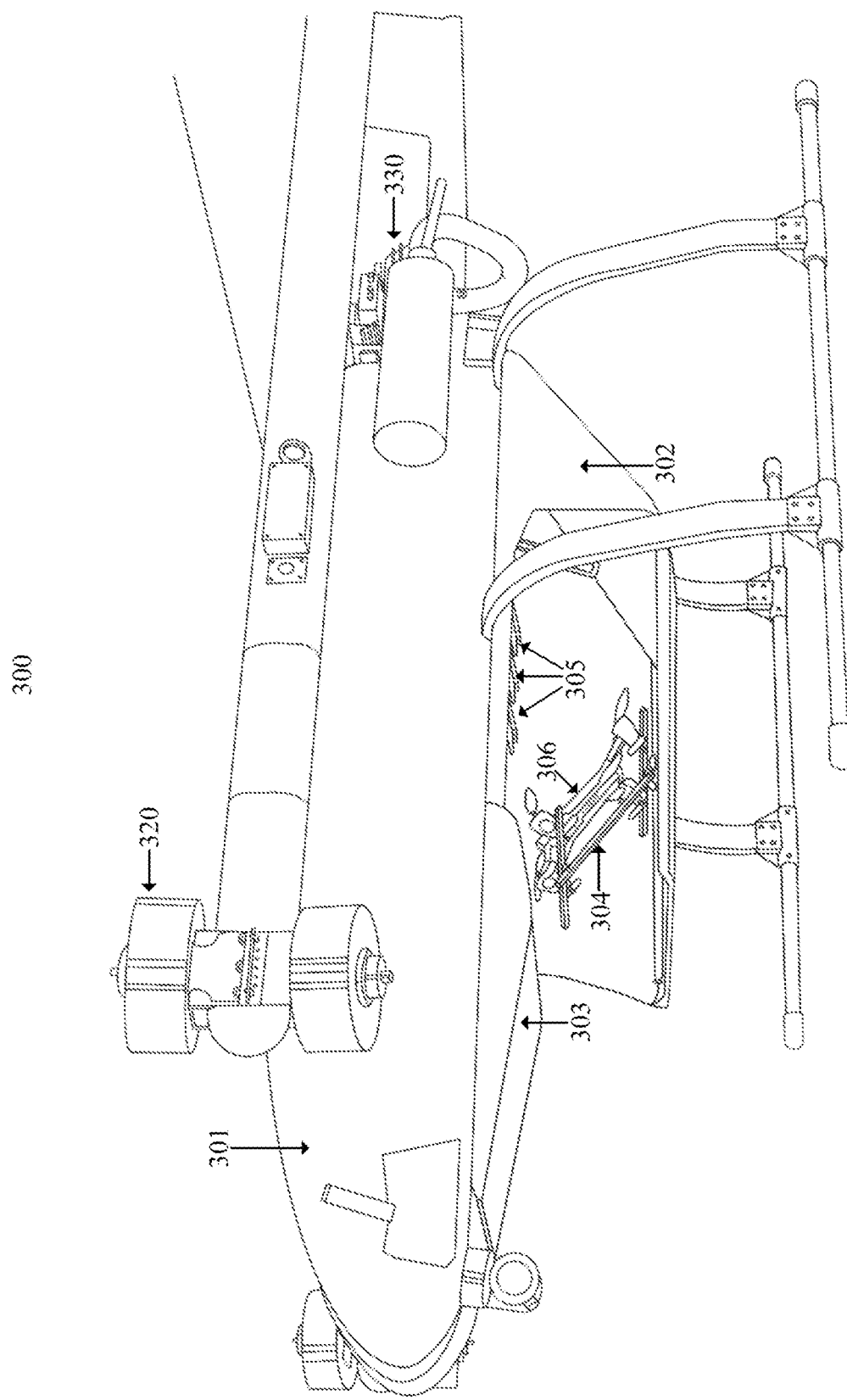
FIG. 3E is a diagram illustrating an exemplary V-TOL UAV Mothership in accordance with aspects of the present disclosure.
Figure 3F:
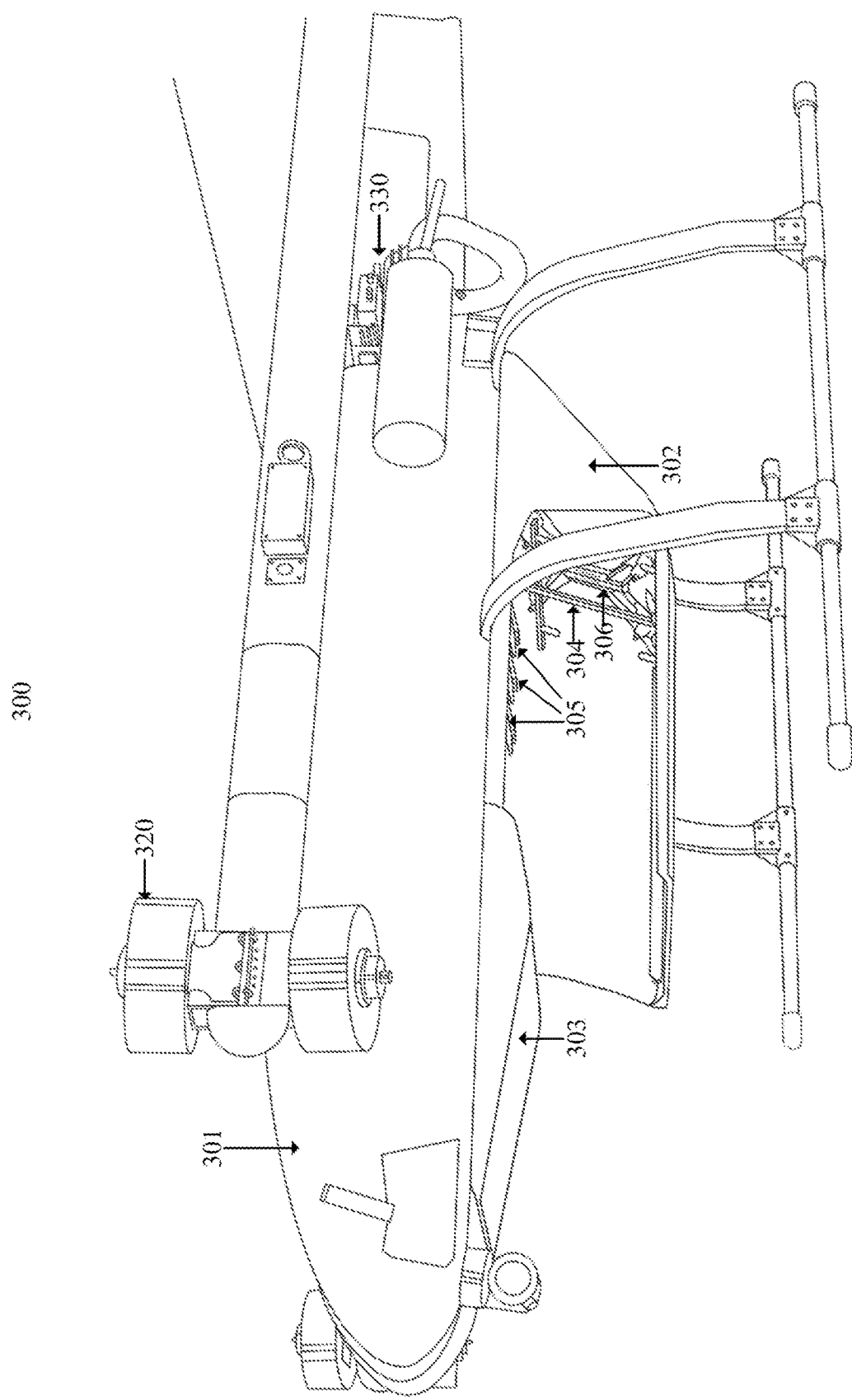
FIG. 3F is a diagram illustrating an exemplary V-TOL UAV Mothership in accordance with aspects of the present disclosure.

FIG. 3D illustrates a recovery of child UAVs 306. The actuated frontal bay opening 303 has been opened to allow the child UAVs 306 to fly into the cargo bay module 302 and land on the child capture device 304. In FIGS. 3E and 3F, the child capture device 304 has engaged the child UAV 306 and has begun the transfer of the child UAV 306 to the child deployment device for storage in the rear portion of the cargo bay module 302.

Figure 3G:
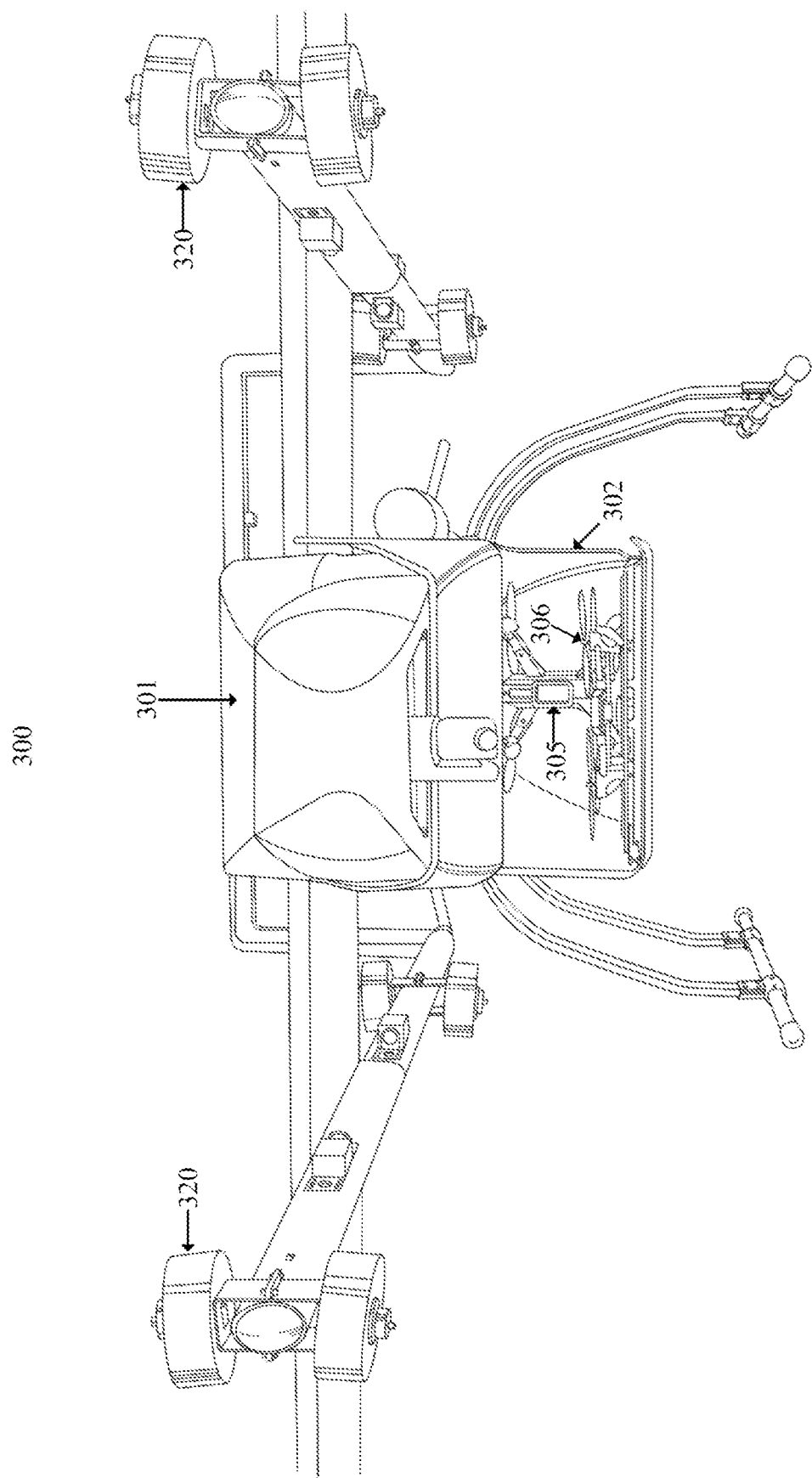
FIG. 3G is a diagram illustrating an exemplary V-TOL UAV Mothership in accordance with aspects of the present disclosure.

FIG. 3G shows an example of a child UAV that has already been stored in the child deployment device at the rear of the cargo bay module 302 while a second child UAV 306 has been captured by the child capture device 304.

Figure 4:
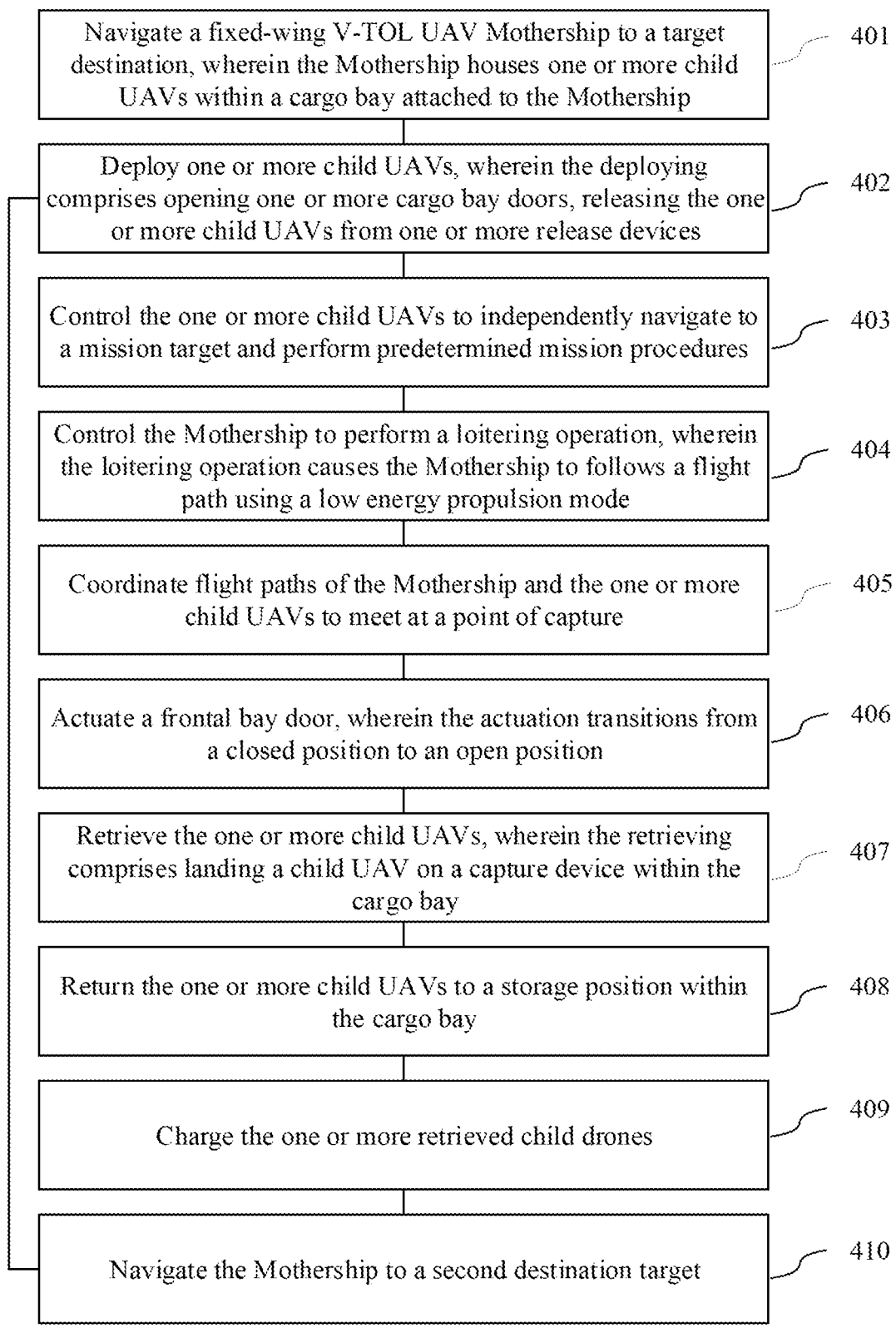
FIG. 4 is a flow chart illustrating an exemplary method that may be performed in accordance with some embodiments.

FIG. 4 is a flow chart illustrating an exemplary method that may be performed in accordance with some embodiments.

At step 401, the method comprises navigating a fixed-wing V-TOL UAV Mothership to a target destination, wherein the Mothership houses one or more child UAVs within a cargo bay attached to the Mothership. The Mothership may hold a mix of micro-UAVs and mid-sized UAVs to perform different missions.

At step 402, the method comprises deploying one or more child UAVs, wherein the deploying comprises opening one or more cargo bay doors, releasing the one or more child UAVs from one or more release devices. Upon releasing the child UAVs, the flight control of the child UAVs may perform a procedure to regain control as the releasing of the child UAVs may cause an unknown orientation of the child UAVs at the point of initiating the child flight controls.

At step 403, the method comprises controlling the one or more child UAVs to independently navigate to a mission target and perform predetermined mission procedures. The child UAVs may also perform partially or fully autonomously. Determination of additional procedures and tasks may be made in real-time by the child UAVs. In some embodiments, additional tasks may be transmitted to the child UAVs from the Mothership or from ground or satellite-based control systems.

At step 404, the method comprises controlling the Mothership to perform a loitering operation, wherein the loitering operation causes the Mothership to follow a flight path using a low energy propulsion mode. The loitering flight path may be determined based on energy usage, response time from the flight path to a retrieval or support position, and safety of the Mothership. For example, in war zones, the most efficient loitering flight path may take advantage of thermals and updrafts, but the path may take the Mothership over enemy territory and risk being shot down.

At step 405, the method comprises coordinating flight paths of the Mothership and the one or more child UAVs to meet at a point of capture. The one or more child UAVs may require retrieval at different times and different locations. The Mothership may plan the retrieval flight path based on the position of the retrieval location and estimated time of retrieval.

At step 406, the method comprises actuating a frontal bay door, wherein the actuation transitions from a closed position to an open position.

At step 407, the method comprises retrieving the one or more child UAVs, wherein the retrieving comprises landing a child UAV on a capture device within the cargo bay. The capture device may grip the child UAV in order to secure it within the cargo bay.

At step 408, the method comprises returning the one or more child UAVs to a storage position within the cargo bay. The capture device may transfer the child UAV along a track or other linear motion device, from the capture position at the front of the cargo bay to a rear section of the cargo bay. Upon reaching the rear of the cargo bay, the capture device may be actuated or articulated in such a way as to place the child UAV into a storage position. The storage position may be in the release device in a pre-release position.

At step 409, the method comprises charging the one or more retrieved child UAVs. The charging may be performed at any time after being captured by the capture device including being stored in the release device. In some embodiments, a depleted battery may be removed from the child UAV and replaced with a charged battery. The replacing may be performed while retained in the capture device, or after being stored in the release device. After the swapping of the batteries, the depleted battery may be stored and charged at a separate compartment in the cargo bay. The charging compartment may also be integrated into the cargo bay walls, ceiling, doors or in the capture device or release device.

At step 410, the method comprises navigating the Mothership to a second destination target. Upon reaching the second or subsequent destination, the method returns to step 402 to repeat the deployment and retrieval process until all missions have been completed.

Figure 5:
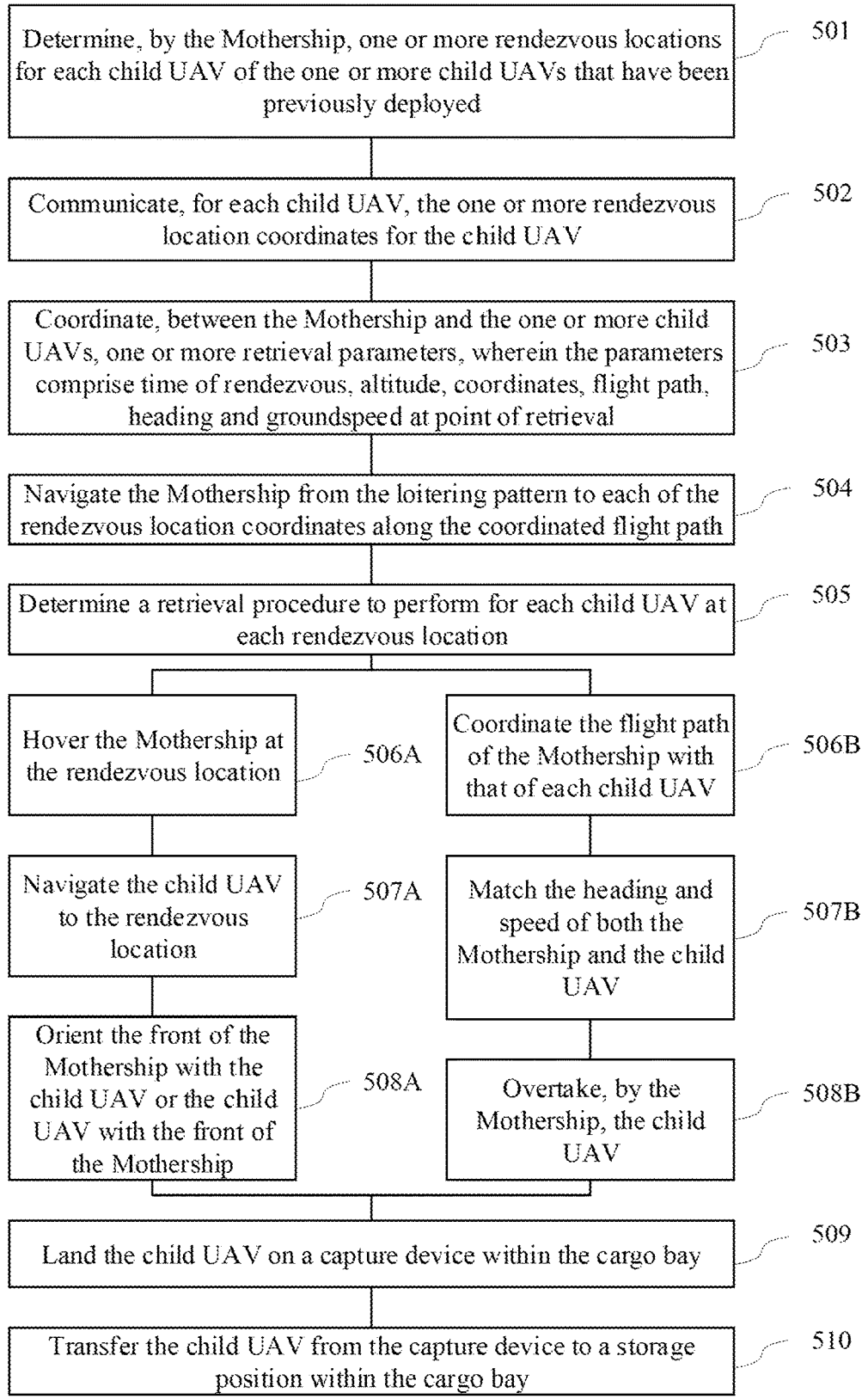
FIG. 5 is a flow chart illustrating an exemplary method that may be performed in accordance with some embodiments.

FIG. 5 is a flow chart illustrating an exemplary method that may be performed in accordance with some embodiments.

At step 501, the method comprises determining, by the Mothership, one or more rendezvous locations for each child UAV of the one or more child UAVs that have been previously deployed.

At step 502, the method comprises communicating, for each child UAV, the one or more rendezvous location coordinates for the child UAV. Each child UAV may have multiple rendezvous locations available to them. The child UAV may make a selection of one of the locations based on flight conditions, environmental conditions and energy consumption. The decision may be made solely by the child UAV, solely by the Mothership, or the decision may be reached collaboratively.

At step 503, the method comprises coordinating, between the Mothership and the one or more child UAVs, one or more retrieval parameters, wherein the parameters comprise time of rendezvous, altitude, coordinates, flight path, heading and groundspeed at point of retrieval.

At step 504, the method comprises navigating the Mothership from the loitering pattern to each of the rendezvous location coordinates along the coordinated flight path.

At step 505, the method comprises determining a retrieval procedure to perform for each child UAV at each rendezvous location. A hover-based retrieval, or an in-flight interception type retrieval may be determined for each child UAV based on position of the Mothership, position of each child UAV, remaining battery level of the Mothership and/or child UAVs, remaining fuel on the Mothership, estimated flight time remaining of the Mothership and/or the child UAVs and/or the most battery, fuel or time efficient procedure.

At steps 506A-508A, the method comprises hovering the Mothership at the rendezvous location, navigating the child UAV to the rendezvous location and orienting the front of the Mothership with the child UAV or the child UAV with the front of the Mothership.

At steps 506B-508B, the method comprises coordinating the flight path of the Mothership with that of each child UAV, matching the heading and speed of both the Mothership and the child UAV and overtaking the child UAV.

At steps 509-510, the method comprises landing the child UAV on a capture device within the cargo bay and transferring the child UAV from the capture device to a storage position within the cargo bay. The storage position may be located in the rear section of the cargo bay. The child UAVs may be stored in the same order and manner as they were before being deployed.

Figure 6:
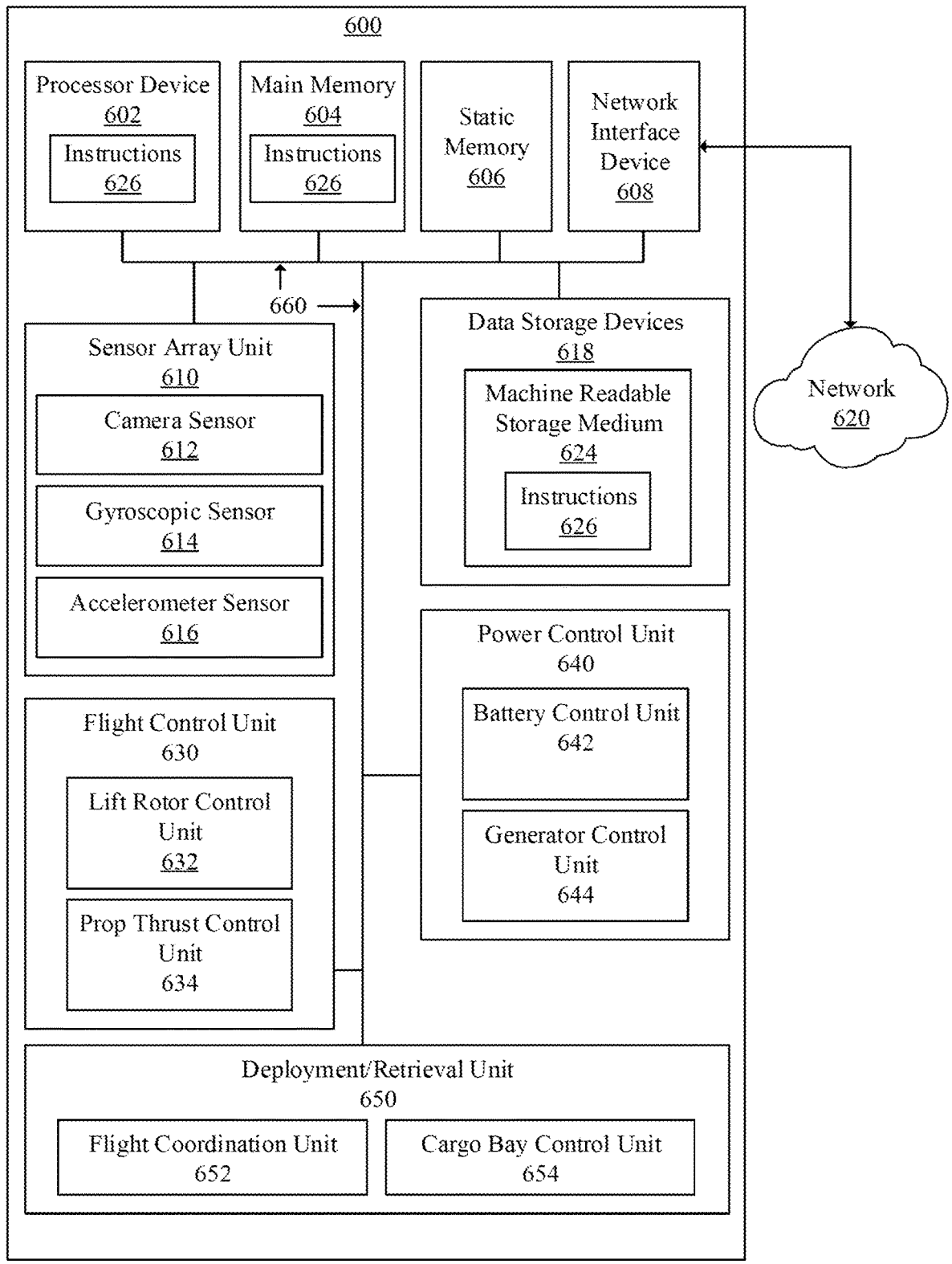
FIG. 6 is a diagram illustrating an exemplary computer/control system that may perform processing in some embodiments and in accordance with aspects of the present disclosure.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 660.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include sensor array 610. Sensor array 610 may comprise a camera sensor 612, gyroscopic sensor 614 and accelerometer sensor 616.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

Flight control unit 630 may comprise lift rotor control unit 632 and prop thrust control unit 634. The flight control unit may control the path planning and adjusting of navigational controls based on the feedback from the sensor array unit 610. The lift control unit 632 may control each lift rotor independently. In some embodiments, pairs or groups of lift rotors may be controlled together. The prop thrust control unit 634 may adjust the pitch of the propeller blades attached to the forward thrust units as well as the power output of the unit.

Power control unit 640 may comprise battery control unit 642 and generator control unit 644. The battery control unit 642 may control the charge and discharge of the battery and facilitate the transfer of power to the lift rotor units. The generator control unit 644 may control an electric generator coupled to the forward thrust units. The generator may be engaged in forward flight to recharge the batteries or to provide additional power to the vertical thrust units. The generator may also be engaged during hovering maneuvers to generate electricity to replenish the energy consumed by the lift rotor units. The forward thrust unit may be in internal combustion engine. The forward thrust unit may be disengaged from the propeller and used to run the generator exclusively during high power usage maneuvers.

Deployment retrieval unit 650 may comprise flight coordination unit 652 and cargo bay control unit 654. The flight coordination unit 652 may collaboratively determine retrieval parameters for a child UAV, or the Mothership may make the determination and communicate the determination to the child UAV through the flight coordination unit 652. The coordination unit 652 may provide real-time adjustments to the Mothership and the child UAV to provide for a successful retrieval of the child UAV. Cargo bay control unit 654 may be used to control the opening and closing of the lower bay doors and the actuated frontal bay opening. The deployment/retrieval unit 650 may also be used to control the capture device and release device.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An unmanned aerial vehicle (UAV) deployment and retrieval platform comprising:
 a vertical takeoff and landing (V-TOL) UAV further comprising:
  a communications unit configured to direct an electromagnetic field to wirelessly induce a current in a child UAV to provide additional energy to ensure that the child UAV reaches an actuated frontal bay opening even after a battery of the child UAV would have otherwise have been depleted;
  a beacon unit;
  a flight control unit;
  a cargo bay, attached to the V-TOL UAV;
  the actuated frontal bay opening;
  one or more bay doors, wherein the bay doors are positions at an underside of the cargo bay;
  a UAV deployment and retrieval unit, wherein the deployment and retrieval unit is configured to:
   hold one or more of the child UAVs within the cargo bay;
   release one or more child UAVs from the V-TOL UAV;
   capture the one or more released child UAVs;
   store the one or more captured child UAVs;
   recharge the one or more captured child UAVs; and
  a cargo bay control unit configured to:
   open the one or more bay doors;

control the actuated frontal bay opening position, wherein the controlling causes the actuated frontal bay opening to reposition from an open position to a closed position or from a closed position to an open position.

2. The UAV deployment and retrieval platform of claim 1, wherein the cargo bay is a modular unit and is detachably connected to a fuselage of the V-TOL UAV.

3. The UAV deployment and retrieval platform of claim 1, wherein the flight control unit is configured to:
plan one or more flight paths from a departure location to one or more destination locations;
determine a loitering pattern after one or more child UAVs have been released from the cargo bay;
determine a retrieval procedure for each of the child UAVs;
determine a retrieval flight path, based on the determined retrieval procedures, from the loitering pattern to recover each of the one or more child UAVs;
pilot the V-TOL UAV along the determined retrieval flight path.

4. The UAV deployment and retrieval platform of claim 3, wherein determining the retrieval procedure for each of the child UAVs comprises:
determining a retrieval location for the child UAV;
determine an altitude at which the retrieval will be performed;
determining a type of retrieval to perform on the child UAV, wherein the type of retrieval comprises a hovering type retrieval, wherein the V-TOL UAV performs a hovering maneuver at the determined retrieval location and the child UAV navigates to the determined retrieval location; and
communicating the retrieval procedure from the V-TOL UAV to the child UAV.

5. The UAV deployment and retrieval platform of claim 3, wherein determining the retrieval procedure for each of the child UAVs comprises:
determining a retrieval location for the child UAV;
determine an altitude at which the retrieval will be performed; determine a heading and ground speed of the V-TOL UAV at the retrieval location;
determining a type of retrieval to perform on the child UAV, wherein the type of retrieval comprises a forward flight capture type retrieval, wherein the V-TOL UAV coordinates an intercept maneuver between the V-TOL UAV and the child UAV; and
communicating the retrieval procedure from the V-TOL UAV to the child UAV.

6. The UAV deployment and retrieval platform of claim 5, wherein the coordinated intercept maneuver comprises:
determining a time at which to perform the retrieval based on environmental conditions and flight parameters of the V-TOL UAV;
matching the heading, altitude and speed of the V-TOL UAV with that of the child UAV, at the determined retrieval location and determined time.

7. A computer implemented method for deploying and retrieving child UAVs from a V-TOL UAV cargo platform, the method comprising:
piloting, by a flight control unit, a V-TOL UAV to one or more destination locations;
deploying one or more child UAVs from the V-TOL UAV at each destination location, wherein the deploying comprises:
controlling a cargo bay, attached to a fuselage of the V-TOL UAV, wherein the controlling is performed by a cargo bay control unit, wherein the cargo bay control unit opens one or more cargo bay doors;
deploying, by a UAV deployment and retrieval unit, one or more child UAVs, wherein the deploying comprises releasing a child UAV through the open one or more cargo bay doors from a holding device; and
navigating the one or more deployed child UAVs to one or more target destinations; piloting, by the flight control unit, the V-TOL UAV into a holding pattern;
retrieving, by the UAV deployment and retrieval unit, the one or more child UAVs, wherein the retrieving comprises controlling an actuated frontal bay opening, wherein the controlling causes the actuated frontal bay opening to reposition from a closed position to an open position; landing the one or more child UAVs on a capture device;
directing an electromagnetic field to wirelessly induce a current in at least one child UAV of the one or more child UAVs to provide additional energy to ensure that the at least one child UAV reaches an open cargo bay door even after a battery of the at least one child UAV would have otherwise have been depleted;
storing the one or more child UAVs; and recharging the one or more stored child UAVs.

8. The computer implemented method of claim 7, wherein the cargo bay is a modular unit and is detachably connected to a fuselage of the V-TOL UAV.

9. The computer implemented method of claim 7, wherein the flight control unit is configured to:
plan one or more flight paths from a departure location to one or more destination locations;
determine the holding pattern after one or more child UAVs have been released from the cargo bay;
determine a retrieval procedure for each of the child UAVs;
determine a retrieval flight path, based on the determined retrieval procedures, from the holding pattern to recover each of the one or more child UAVs;
pilot the V-TOL UAV along the determined retrieval flight path.

10. The computer implemented method of claim 9, wherein determining the retrieval procedure for each of the child UAVs comprises:
determining a retrieval location for the child UAV;
determine an altitude at which the retrieval will be performed;
determining a type of retrieval to perform on the child UAV, wherein the type of retrieval comprises a hovering type retrieval, wherein the V-TOL UAV performs a hovering maneuver at the determined retrieval location and the child UAV navigates to the determined retrieval location; and
communicating the retrieval procedure from the V-TOL UAV to the child UAV.

11. The computer implemented method of claim 9, wherein determining the retrieval procedure for each of the child UAVs comprises:
determining a retrieval location for the child UAV;
determine an altitude at which the retrieval will be performed;
determine a heading and ground speed of the V-TOL UAV at the retrieval location;
determining a type of retrieval to perform on the child UAV, wherein the type of retrieval comprises a forward flight capture type retrieval, wherein the V-TOL UAV coordinates an intercept maneuver between the V-TOL UAV and the child UAV; and communicating the retrieval procedure from the V-TOL UAV to the child UAV.

12. The computer implemented method of claim 11, wherein the coordinated intercept maneuver comprises:
   determining a time at which to perform the retrieval based on environmental conditions and flight parameters of the V-TOL UAV;
   matching the heading, altitude and speed of the V-TOL UAV with that of the child UAV, at the determined retrieval location and determined time.

* * * * *